Patented Sept. 16, 1941

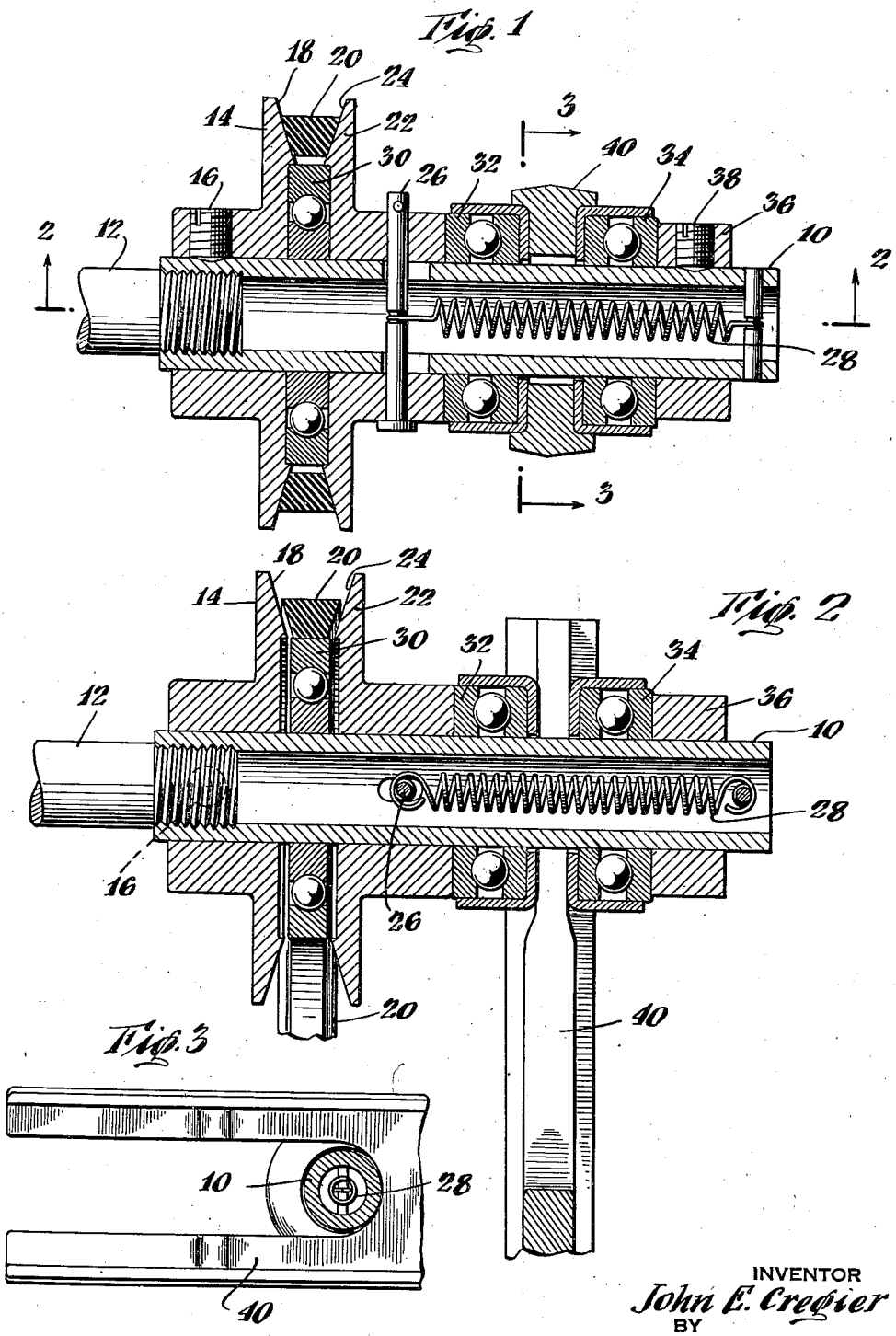

2,256,312

UNITED STATES PATENT OFFICE 2,256,312

CLUTCH MECHANISM FOR V-BELT DRIVES

John E. Cregier, Chappaqua, N. Y.

Application July 15, 1939, Serial No. 284,646

2 Claims. (Cl. 74—219)

This invention relates to a form of clutch to be used with the V-belts which are now employed very largely with small power units.

The clutch of my invention is employed with a shaft which may be either a driving shaft or a driven shaft, but which ordinarily will be the driving shaft. Freely rotating on this shaft is a ring having a flat face which is preferably broad enough to carry the inner face of the usual type of V-belt. Two side members are provided having faces pitched at the same pitch as the sides of the V-belt and these side members are relatively movable, but both of them are fixed (as by keying or the like) against rotation around the shaft. Usually, one of these side members is fixed and the other is longitudinally movable along the shaft.

The side members ordinarily are arranged to have a portion overlying the face of the freely rotating ring, but in any event, it is essential that the side members can be moved sufficiently close together so that the space between them is too small to permit the V-belt to contact with the freely rotating ring.

In operation, when the two side members are brought together, the belt will run in the groove formed between them and will contact with them on their pitched faces (with the flat inner face of the belt held out of contact with the clutch members) and either drive or be driven by them as they rotate with the shaft. On the other hand, when the members are separated (as by sliding one of them along the shaft) the belt will drop down between them and its inner face will contact with the freely rotating ring so that the shaft and belt will be quite independent of each other and one can move without causing the other to move. In the latter case, the side members will act as guides for the belt but if the belt is properly lined up there will be very little friction between the belt and the side members when the clutch is in disengaged position.

As an alternative, the relative movement of the side members may be such that when they are brought together they will grip or lock the inner ring between them and cause it to rotate with the shaft. In such case, it will not be necessary for the side members to move close enough together to lift the belt entirely out of contact with the ring, though the belt should, of course, make firm contact with both side members.

This invention can be readily understood by reference to the accompanying drawing which shows an illustrative example. In this drawing, Fig. 1 shows a section through an embodiment of my invention, with the clutch in closed or engaging position; Fig. 2 is a section on line 2—2 of Fig. 1 but showing the clutch in the open or disengaged position; Fig. 3 is a view taken at right angles to the view of Fig. 1 showing a side view of the control yoke.

The numeral 10 designates a hollow shaft which is here shown as threaded onto a driving shaft 12. A side member 14 is locked onto the shaft 10 as by the set screw 16. The side member 14 has a face 18 of proper pitch to contact with the side of a usual type of V-belt 20.

A second side member 22 has a face 24 complementary to the face 18. The side member 22 slides longitudinally along the shaft 10 but is held against rotation about the shaft 10 by the pin 26. A spring 28 tensions side member 22 away from side member 14.

A ring 30 rotates freely about shaft 10. In the embodiment here illustrated, the ring 30 is simply the outer part of a ball bearing which loosely engages shaft 10. It will be noted that side members 14 and 22 are cut away so that faces 18 and 24 can slightly overlie the outer face of ring 30. When side member 22 is held toward side member 14 the space between the faces 18 and 24 is insufficient for belt 20 to drop down far enough to contact with ring 30. However, as shown in Fig. 2 when side member 22 moves away from side member 14 the belt 20 bears on ring 30 and is free from anything more than guiding contact with faces 18 and 24.

The mechanism here shown for moving side member 22 toward side member 14 comprises a pair of thrust bearings 32 and 34 loosely fitting around shaft 10. A lock ring 36 held in place on shaft 10 by screw 38 holds thrust bearing 34 in position on the shaft.

Between thrust bearings 32 and 34 is a fork-shaped member 40 which has an increased thickness toward its closed end as clearly indicated in Fig. 2. When the outer and thinner portions of the fork 40 are between the thrust bearings 32 and 34, spring 28 will hold side member 22 away from side member 14 as indicated in Fig. 2. However, when fork 40 is pushed in so that the thicker portions of the forks are between the thrust bearings, side member 22 will be held over toward side member 14 as indicated in Fig. 1. The forked member 40 may be provided with any desired sort of handle (not shown) by which it can be pushed in or drawn out.

Ordinarily the rotation of shaft 12 will be started with the parts in the position shown in Fig. 2. In such case the side members 14 and 22 will rotate relative to the belt 20 and will not cause it to move, as the belt 20 will be resting on ring 30 which remains idle while shaft 10 rotates within it. When forked member 40 is pushed in, side member 22 will be moved over toward side member 14 and during the course of this movement, belt 20 will ride up between the faces 18 and 24 and being held between these faces will transmit power in the usual manner.

By providing a spring which tensions members 18 and 20 apart and by supplying the wedge 40 between member 22 and stop 36, I provide an operating mechanism which is positive in holding the members 22 and 14 together when the belt is to be driven. At the same time, the structure can be treated as an integral unit, for it is unnecessary to supply any outside fulcrum point as an operating means. This greatly simplifies the device and its installation into various types of equipment.

In the foregoing description the device is referred to as applied to a driving shaft. Obviously, it is also applicable to a driven shaft.

What I claim is:

1. In combination, a shaft, a ring freely rotatable about the shaft, a pair of relatively movable side members held to rotate with the shaft on the sides of said ring and adapted to cooperate to form a groove to receive a V-type belt, spring means for tensioning said side members apart to permit such a belt to rest upon said freely rotatable ring, stop means carried by the shaft, and a wedging member adapted to be interposed between said stop and one of said movable side members positively to hold said side members clamped together closely enough to grip such a belt, such wedging member having two substantially flat portions of different thickness with a wedging portion between them, so that such member will remain fixed when either of such portions is in operative position but may be moved from one position to the other, and one of said portions being thin enough to permit said side members to separate so that the belt may rest upon the freely rotatable ring and the other portion being thick enough to hold the said side members in belt gripping position.

2. A structure as specified in claim 1 which further comprises two thrust bearings mounted on the shaft between which such wedge member passes and in which the wedge member has portions positioned on opposite sides of the shaft for reciprocal movement between said thrust bearings to hold said side members together, and to permit said side members to separate.

JOHN E. CREGIER.